Aug. 5, 1969 E. PASTOORS ET AL 3,459,122
APPARATUS FOR THE CONTINUOUS EXTRACTION
OF MOISTURE FROM SUSPENDED MATTER
Filed May 9, 1966
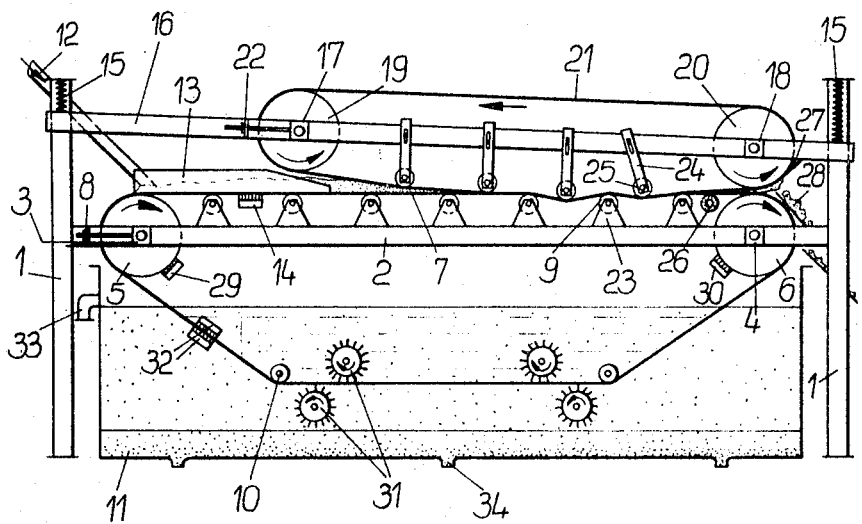
Eduard Pastoors
Rudolf Saller
  Inventor
ATTORNEY United States Patent Office 3,459,122
Patented Aug. 5, 1969

3,459,122
APPARATUS FOR THE CONTINUOUS EXTRACTION OF MOISTURE FROM SUSPENDED MATTER
Eduard Pastoors, Essen, and Rudolf Sailer, Cologne-Mungersdorf, Germany, assignors to Firma Albert Klein K.G., Niederfischbach (Sieg), Germany, a corporation of Germany
Filed May 9, 1966, Ser. No. 559,026
Claims priority, application Germany, May 8, 1965, K 56,065
Int. Cl. B30b 9/24
U.S. Cl. 100—118     5 Claims

ABSTRACT OF THE DISCLOSURE

An apparatus for extracting moisture from slurries and the like having a pair of flexible moving belts which engage one another and press the slurry between them.

---

In the removal of water from suspension, as in the case of sewage sludge, a number of arrangements have been used, such as press and vacuum filters, capillary band pass filters, centrifuges, thickeners, and screening machines, all of which suffer from a number of serious drawbacks. For instance, there is a tendency for blockage of the filter media, and rapid heavy wear. In addition, the generally low capacity of a given piece of equipment results in high installation and operating costs. Furthermore, the separating action is, in many cases, open to criticism. Some of these problems have been removed by use of an apparatus having a continuously rotating capillary band pass filter effecting a further dehydration by means of pressure rollers but, here also, the efficiency falls short of expectations and the sensitive capillary filter pass band is subjected to heavy wear. These and other difficulties experienced with the prior art devices have been obviated in a novel manner by the present invention.

It is, therefore, an outstanding object of the invention to provide an apparatus for the removal of liquid from solid matter.

Another object of this invention is the provision of an apparatus for removing water from sludge, which apparatus is simple in construction, inexpensive to manufacture, and which is capable of a long life of useful service with a minimum of maintenance.

A further object of the present invention is the provision of an apparatus for draining water from mixtures with solid materials, which apparatus accomplishes this function efficiently and continuously.

It is another object of the instant invention to provide a dehydrating apparatus which does not clog and which is not subject to heavy wear.

With these and other objects in view, as will be apparent to those skilled in the art, the invention resides in the series of procedural steps and the combination of parts set forth in the specification and covered by the claims appended hereto.

The character of the invention, however, may be best understood by reference to one of its structural forms, as illustrated by the accompanying drawing in which:

The single figure shows a vertical sectional view of an apparatus embodying the principles of the present invention.

Generally speaking, this invention consists of a process and an apparatus in which an endless moving sieve band of monofilament metal or synthetic material wire is guided around rollers. Against this band is pressed a pressure band moving in the same direction, so that the sludge inserted between them is dehydrated under pressure. It has been found that the outputs obtained with this arrangement can be considerably increased by using a sieve band having a mesh which is large compared to the size of the particle of suspended matter; the suspended matter to be freed from moisture is deposited on this band, thus avoiding forces acting on it from exterior sources. According to another procedural concept, the suspended matter is carried through a first web section of the sieve band for a preliminary dehydration, likewise avoiding further forces acting on it from the outside. It has been found that, so long as the proportion of moisture in the suspended matter is not so great that the liquid to be separated flows through the sieve fabric at such speed (due to gravitational forces) that the solid particles dispersed therein are carried with it, a process takes place by which water can pass through the meshes of the sieve band and the suspended matter located on the sieve band is thickened by the removal of water. Furthermore, the suspended particles are deposited on the meshes of the sieve band in such a manner that they cover the meshes in a bridge-like and arcuate manner. This builds a filter layer on the actual sieve band which, with increasing dehydration and increasing thickness, becomes mechanically stiffer. After running through a first web section of the sieve band, which section is sufficiently long to bring about the formation of such a filter layer, the material to be processed is subjected in another web section to a loading which acts perpendicularly of the sieve surface. This is accomplished by means of a pressure band. The force loading starts at a low value and slowly increases, so that the further dehydration which occurs under pressure gives only a slight stressing of the layer of the product built over the sieve band, and the perpendicular stress increases only with increasing dehydration and thereby with this increasing stiffness of this layer.

It has been found beneficial, as a third step of the process, to allow the perpendicular stressing to increase slowly and continuously in a first part of the stressing zone, while in a following short section, the pressure is maintained substantially constant and at its maximum value. It has proved to be advantageous, in particular during the passage through the second section of the stressing zone, to superimpose tangential forces. This brings about shearing forces inside the layer which serve further to reduce its volume and water content. The returning sieve band is subjected to an appropriate cleaning process.

For the carrying out of the process in accordance with the invention, a moving sieve band is used which is wide-meshed relative to the size of the particles of the suspended matter. With this band is associated a feed apparatus which distributes the material and deposits it at low speed on the sieve band. Following the material delivery place there is provided (at a distance ensuring a pre-dehydration as well as stratification over the sieve band) the pressure band which, with the sieve band, defines a wedge-shaped gap of small angle and relatively great length, so that the material to be dehydrated is subjected to perpendicularly-directed pressure forces which, lengthwise of the conveying path, increase continuously and slowly. It has proved desirable, in order to support the pressure band, to provide resilient pressure rollers and to mount them adjustably in a slightly-inclined frame. It has also proved expedient to support this frame resiliently and to arrange for it to be adjustable and controllable. It has been found to be essential, at least in the second part of the pressure zone, to space the pressure rollers and the supporting rollers bearing the sieve band relative to one another in the direction of movement of the bands. It has also proved to be expedient to drive the pressure band as well as the sieve band in the same direction but a different linear speeds.

It has proved to be advantageous to provide scrapers or bars at the underside of the sieve band for removing water held by the sieve due to the surface tension. It has also been proved satisfactory to provide for the same purpose rollers or supporting cylinders which have a metallic, elastic or brush-like upper surface which contacts the sieve band over its full width. In particular, when using metal rollers it may prove to be expedient to provide a wiping or scraping device for removing water held by adhesion on the surface. It has been found convenient to provide cleaning devices in the lower run of the sieve band, which devices may be formed as rotating and/ or fixed brushes having, if desired, cleaning nozzles which effect a further cleaning of the sieve band by means of pressure water jets. For dehydrations exceeding the usual extent, a cascade-like arrangement of pressure zones of increasing perpendicular force, which forces are increased by means of rollers, may be provided. It has also been found convenient to use as the pressure band a band formed of resilient rubber or synthetic material and to associate with its return guide roller a scraper as well as a delivery chute located below it. It has also been found to be satisfactory to provide the pressure band directed on one side to the dehydrate with constantly-evaporating softening chemicals.

Referring to the drawing, the frame stands 1 are shown as connected to one another by means of transverse elements 2. On the elements 2 are mounted bearings 3 and 4 supporting guide rollers 5 and 6. A sieve band 7 is mounted on the rollers and the bearings 3 are made adjustable by means of tension devices 8, while the bearings 4 are firmly secured on the elements 2. The upper run of the sieve band 7 is supported by fixed rollers 9, while the lower run, which passes through a rinsing trough 11, is guided by rollers 10.

The material being processed is fed to the band 7 via a mixing tube 12 which feeds the said material at a slow speed to the band over a deposit plate positioned at the lower end of the tube. A lateral loss of the suspended matter is prevented by providing side plates 13. A scraper 14 located under the band serves to remove water held by surface tension below the meshes of the sieve band.

On an upper carrying frame 16 are mounted bearings 17 and 18 for the guide rollers 19 and 20 of a pressure band 21. The frame 16 is connected to the frame stands 1 via buffer springs 15. While the bearing 17 is adjustable by means of the tension device 22, the opposite bearing 18 is fixedly attached to the supporting frame. The lower run of the pressure band 21 is acted on by pressure rollers 25 which are connected by means of struts 24 to the upper supporting frame 16. In the preferred embodiment, the struts 24 are adjustably connected to the supporting frame so that the applied pressure can be adapted to the requirements at a given time. In contrast to this, however, the supporting rollers 9 of the sieve band are arranged in bearing blocks mounted firmly on the element 2.

A scraper 27 is provided in association with guide roller 20, such scraper being intended to effect the removal of the dehydrated material from the band 21, such material being led away via a chute 28. In the embodiment illustrated, the chute is in two parts and, therefore, is also able to receive material from the sieve band 7. The loosening of the material from the sieve band is facilitated by means of a lifting roller 26 arranged under it.

The cleaning of the sieve band and the guide rollers therefor is effected by means of the scrapers 29 and 30 contacting the guide rollers and by means of rotatable driven cleaning brushes 31. Additionally, the sieve band is guided through brush-like scrapers 32 which are provided with pressure water nozzles for intensive cleaning. Surplus liquid leaves the rinsing trough 11 via an overflow fitting 33, while deposited suspended particles may be drawn off at one of several discharge outlets 34.

The operation of the apparatus will now be readily understood, in view of the above description. One guide roller of each of the sieve band and pressure band are driven, while the suspended matter to be dehydrated is fed to the sieve band via the mixing tube 12. By suitable construction of the lower end of the tube and by selecting an appropriate rate of feed, the depositing of the suspended matter is brought about without substantial pressure or acceleration forces which act perpendicular to the horizontal sieve band. The sieve band has mesh which is considerably larger (by several powers of ten) than the diameters of the particles of the suspended matter. The height of the layer of the suspended matter on the sieve band is adjusted so that approximate equilibrium is attained between the gravity forces which urge the liquid and solid substances through the sieve meshes and the capillary forces dependent on the surface tension which prevent the liquid passing through the sieve. In the zone of this stable condition, the particles of the suspended matter collect over the sieve meshes in a bridge-like, arcuate manner. This forms a structure which resists strong pressure forces and forms a filter layer which, in turn, holds back particles from the suspended matter having a diameter disproportionately smaller than the width of mesh of this sieve. By a suitably long first section of the sieve band (in which section this layer is formed and in which preliminary dehydration takes place) the result is obtained that, at the beginning of the pressure zone effected by means of the pressure band, a preliminary structural arrangement of partially dehydrated material is already present. For this first section 20–50% of the effective running length of the sieve band, and preferably about 35%, has proved to be satisfactory; at the same time, the conveyor band may have a width of mesh in the range from 0.5 to 2 mm., preferably in the range from 0.8 to 1 mm.

Removal of water from below the mesh of the sieve band may be effected during the process by passing the band in contact with the supporting rollers 9. Due to the surface tension, the moisture held below and inside the mesh is transferred to the surface of the rollers. For the additional removal of water, the scraper 14 is provided on the underside of the sieve band 7.

The product to be dehydrated subsequently passes into the stress zone brought about by the perpedicular pressure of the pressure band 21. By means of a wedge-shaped entrance zone of a suitable length, the perpendicular pressure exercised by the pressure band slowly and continuously increases from zero to a maximum value during the conveying of the material to be dehydrated. With this increasing pressure, the dehydration and the solidifying of the texture of the product is brought about, so that a powerful dehydration is carried out without the material being able to pass through the relatively wide meshes of the sieve band. The maximum pressure is maintained approximately constant during a second section within the stressing zone. By suitable displacement of the supporting and pressure rollers 9 and 25 relative to one another in the direction of the length of the bands, the pressure and sieve bands (with the material to be dehydrated lying therebetween them) are deflected outwardly. This takes place at the guide places during the uniform transport of the bands and, because of the differences between the inner and outer radii, differences in speed occur. These differences of speed are carried into the layers of the material to be dehydrated and shearing forces take place there which destroy the hollow spaces within the layers containing water. By means of these shearing forces, an intensifying and an acceleration of the dehydration is effected. It has also been proved satisfactory to arrange pressure and supporting rollers near the end of the bands which are opposite one another in order to obtain a roller nip at the outlet from the conveying path.

At the end of the conveying path, the sieve band is raised by a lifting roller 26 which is preferably provided with brushes. This separates the layer of dehydrated material from the band so that it sticks to the pressure band 21. The removal of the layer from the pressure band is effected by means of the scraper 27 from which the material is removed via the chute 28. The material adheres to the pressure band because this band is prepared from a rubber-like elastic material. A further increase in the adherence is effected because the side coming into contact with the dehydrate is provided with a softener of evaporating material.

The buffer springs 15 are so adjusted that a position of the upper supporting frame 16 is satisfactory for obtaining the required increase and distribution of pressure. If coarser impurities are mixed with the suspended matter to be dehydrated or come into the space between the sieve band and the pressure band, then these bands are protected against overloading by the flexibility of the springs and the foreign bodies may pass through without damage to the apparatus.

It has been proved that the efficiency of the apparatus for the continuous extraction of moisture from suspended matter is dependent on the thickness of the layer which is deposited. The optimum height of the layer depends on the specific weight of the suspended matter, the surface tension of the liquid, the material and the size mesh of the sieve, and the granular characteristic of the suspended matter, this latter factor including the average statistical diameter of particles as well as the representative average shape of the dispersed particles. By control of the inflow by adjustable regulating means, the preferred height of the layer can be determined and an additional preliminary dehydration, as well as a predetermined shaping of the material, is attained. It has also been demonstrated that, after a sufficient deposit time, suspended matter drawn off from the sump of a depositing basin or from a sewage filter is very suitable for treatment on the aforedescribed apparatus for the continuous extraction of moisture. Thus, the apparatus provides for the treatment of sewage sludge in the form of fresh as well as also putrid sludge. Its efficiency far exceeds that of more expensive arrangements.

It is obvious that minor changes may be made in the procedural steps and in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An apparatus for the continuous extraction of moisture from comminuted solid materials and the like, comprising
    (a) an endless sieve band mounted on two spaced, parallel guide rollers to provide a substantially horizontal upper surface,
    (b) an endless pressure band overlying the said surface and mounted on two spaced parallel guide rollers to provide a lower run having a downwardly-directed surface, resilient pressure rollers are provided for supporting the pressure band, wherein these pressure rollers are supported in a common frame, wherein the said frame is resiliently supported and adjustably held, wherein the sieve band is supported on fixed rollers, and wherein the said fixed rollers are arranged in a displaced manner.

2. An apparatus as recited in claim 1, wherein a plurality of supporting rollers underlies the said upper run of the sieve band, each of the said pressure rollers being located between two of the said supporting rollers, so that, in the area of engagement of the said upper run of the sieve band and lower run of the pressure band, the bands move together in a generally zig-zag path.

3. An apparatus as recited in claim 1, wherein means is provided to feed materials onto one end of the said upper run of the sieve band and to remove them from the other end, and wherein the pressure band overlies only a portion of the said upper run adjacent the said other end.

4. An apparatus as recited in claim 1, wherein the surface speed of the sieve band and other pressure band differ from one another.

5. An apparatus as recited in claim 1, wherein scrapers are placed below and against the sieve band for the removal of liquid retained on the band by surface tension, wherein rollers are provided contacting the undersurface of the sieve band for the removal of such liquid, wherein cleaning brushes are associated with the lower run of the sieve band, and wherein a rinsing trough is provided acting on the lower run of the sieve band.

References Cited
UNITED STATES PATENTS

| | | | |
|---|---|---|---|
| 2,730,933 | 1/1956 | Reynolds | 210—386 X |
| 3,110,244 | 11/1963 | Goodale | 100—120 |
| 3,138,088 | 6/1964 | Foth | 210—386 X |
| 3,330,206 | 7/1967 | Bechard | 210—386 X |

OTHER REFERENCES

Chemical Engineers Handbook, J. H. Perry, Fourth Edition, 1963, McGraw-Hill Book Co., Inc., New York, pp.19–60.

SAMIH N. ZAHARNA, Primary Examiner

U.S. Cl. X.R.

210—386, 400